US009848306B2

(12) United States Patent
Wouhaybi

(10) Patent No.: US 9,848,306 B2
(45) Date of Patent: Dec. 19, 2017

(54) CONTEXTUALLY AWARE DYNAMIC GROUP FORMATION

(71) Applicant: Intel Corporation, Santa Clara, CA (US)

(72) Inventor: Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/573,093

(22) Filed: Dec. 17, 2014

(65) Prior Publication Data
US 2016/0183064 A1    Jun. 23, 2016

(51) Int. Cl.
| H04W 24/00 | (2009.01) |
|---|---|
| H04W 4/08 | (2009.01) |
| H04W 4/02 | (2009.01) |

(52) U.S. Cl.
CPC .............. *H04W 4/08* (2013.01); *H04W 4/02* (2013.01)

(58) Field of Classification Search
CPC ......... H04M 1/72572; H04M 2250/12; H04M 1/72569; H04L 67/12; H04W 4/027; H04W 4/026; H04W 24/08; H04W 64/00; H04W 4/043; H04W 4/025; G01C 22/00; G01S 19/49
USPC .......... 455/456.3, 456.1, 456.2, 457
See application file for complete search history.

(56) References Cited

U.S. PATENT DOCUMENTS

| 7,644,144 | B1 * | 1/2010 | Horvitz ............. G06Q 10/10 709/203 |
| 7,680,959 | B2 * | 3/2010 | Svendsen .......... G06F 17/30017 709/213 |
| 7,783,777 | B1 | 8/2010 | Pabla et al. |
| 8,621,656 | B2 * | 12/2013 | Miettinen ............. G06F 21/31 726/1 |
| 2009/0063419 | A1 | 3/2009 | Nurminen et al. |
| 2012/0011559 | A1 * | 1/2012 | Miettinen et al. ...... G06F 21/31 726/1 |
| 2012/0264446 | A1 * | 10/2012 | Xie ...................... G01C 22/00 455/456.1 |
| 2013/0104221 | A1 | 4/2013 | Low et al. |
| 2013/0304898 | A1 | 11/2013 | Aggarwal et al. |
| 2014/0324979 | A1 * | 10/2014 | Gao ...................... G06F 17/00 709/204 |

FOREIGN PATENT DOCUMENTS

WO    2014123738 A1    8/2014

OTHER PUBLICATIONS

International Search Report and Written Opinion for International Patent Application No. PCT/US2015/063989, dated Mar. 30, 2016, 13 pages.

* cited by examiner

*Primary Examiner* — Lester Kincaid
*Assistant Examiner* — Sayed T Zewari
(74) *Attorney, Agent, or Firm* — Jordan IP Law, LLC

(57) ABSTRACT

Systems, apparatus, and methods may provide for contextually aware dynamic group formation. In one aspect a connection manager has a contextual location identifier to determine a contextual location based on one or more locations frequented by a device user. A list generator may generate a contextual location group device list of trusted devices within the contextual location group. An identification generator may generate a contextual location group identification to serve as a data sharing token for the trusted devices within the contextual location group.

24 Claims, 6 Drawing Sheets

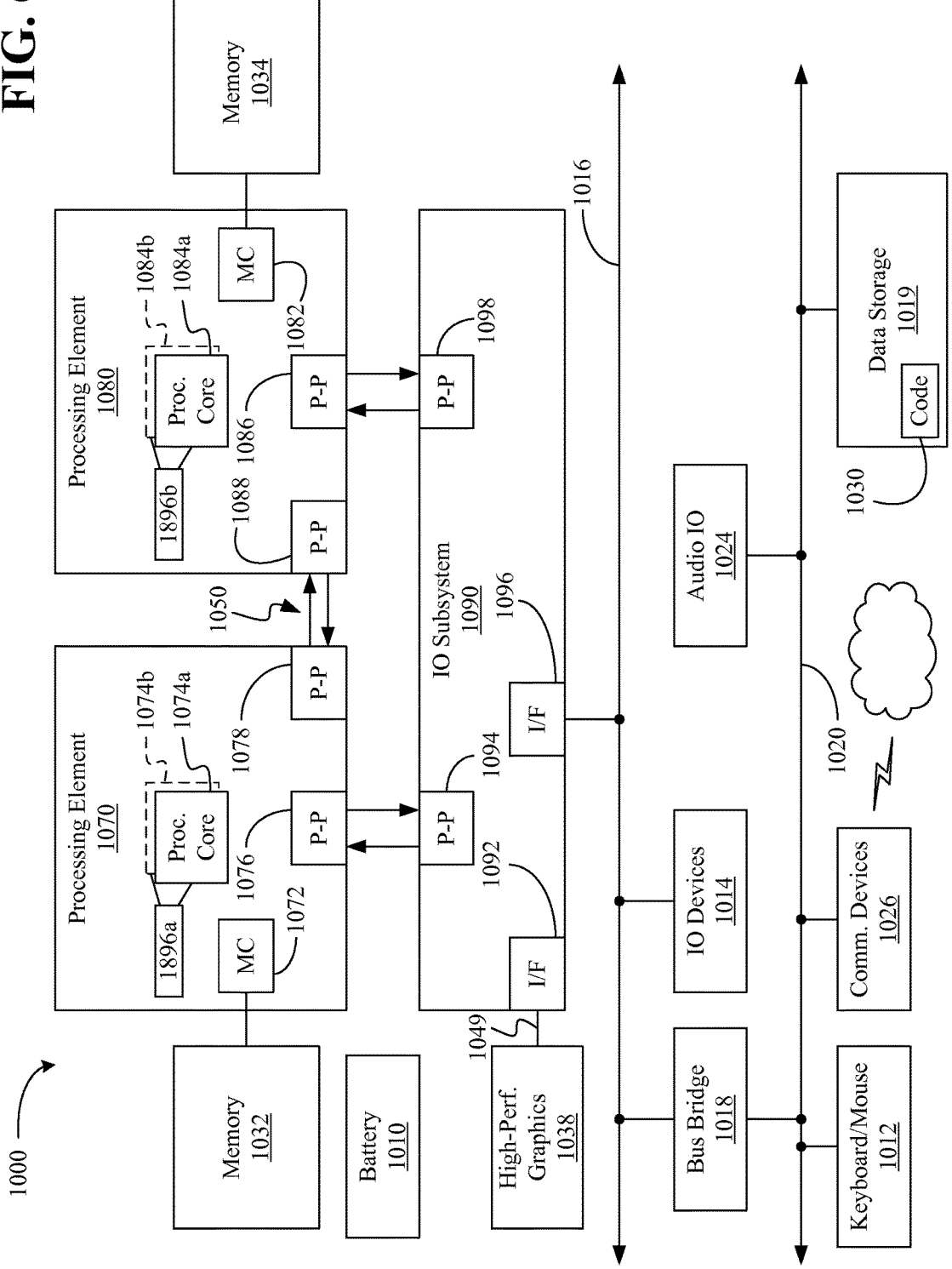

CONTEXTUALLY AWARE DYNAMIC GROUP FORMATION

TECHNICAL FIELD

Embodiments generally relate to group formation among devices. More particularly, embodiments relate to contextually aware dynamic group formation among devices.

BACKGROUND

Recently, peer-to-peer sharing among devices, particularly mobile devices, has occurred using various "apps" (applications) where a connection between devices appears to be peer-to-peer but actually goes through an external network and a cloud service. Using an external network potentially invades the privacy of the users by exposing their data to third parties. Further, the use of various apps may "sandbox" the sharing to that particular app. That is, plugins may be required to support the apps. Moreover, additional code may be required to enable the copying of data.

Many situations may arise where it is desirable for a user to share data with one or more other users. For example, a user visiting customers or attending a meeting may wish to share files with a newly formed group of devices. True peer-to-peer file sharing with such groups, however, may currently be cumbersome or involve going through an external network.

BRIEF DESCRIPTION OF THE DRAWINGS

The various advantages of the embodiments will become apparent to one skilled in the art by reading the following specification and appended claims, and by referencing the following drawings, in which:

FIG. 6 is a block diagram of an example of a system according to an embodiment.

DESCRIPTION OF EMBODIMENTS

Figure 1:
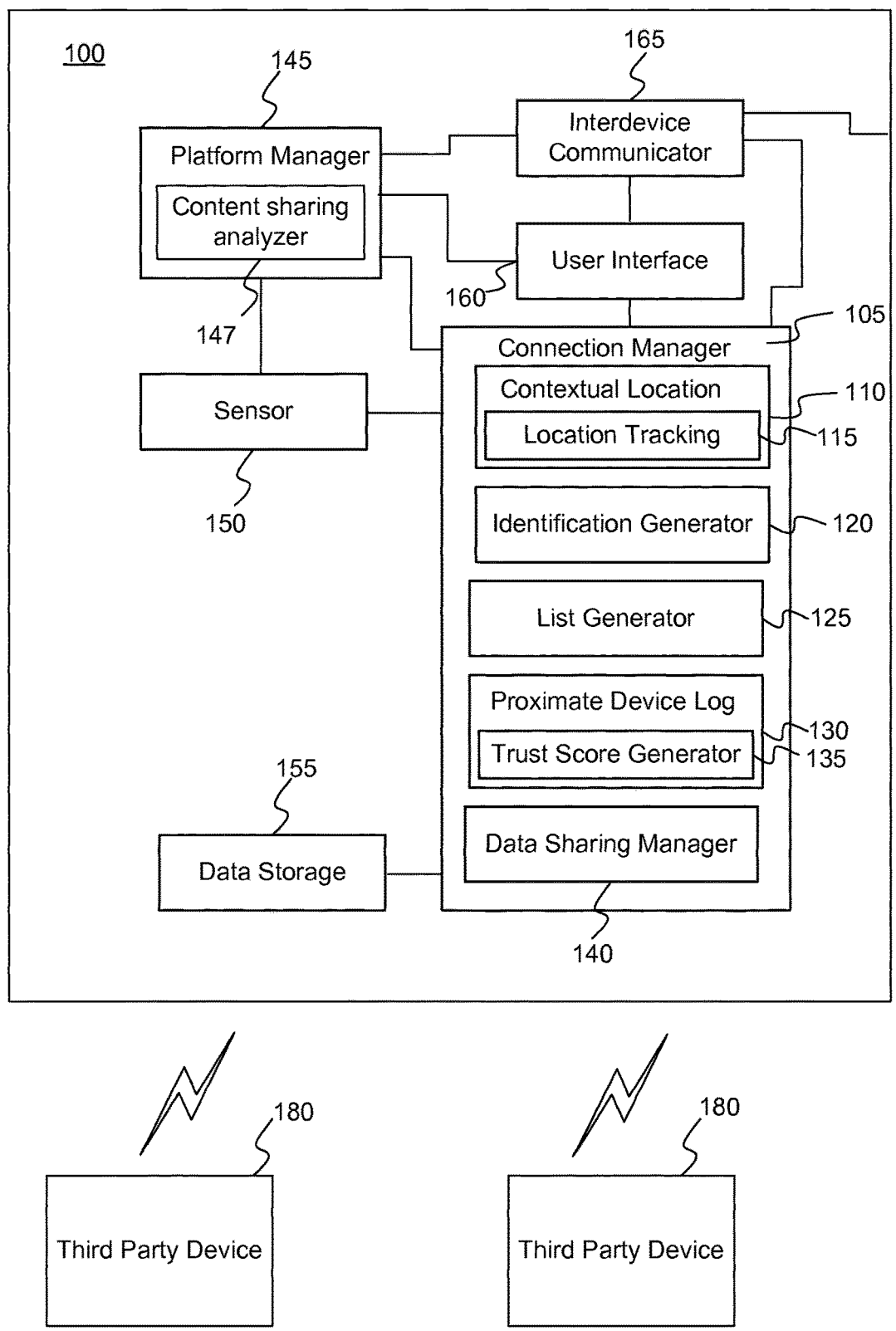
FIG. 1 is a block diagram of an example of a computer platform including a connection manager apparatus according to an embodiment.

Turning now to FIG. 1, a computer platform 100 including a connection manager apparatus 105 is schematically depicted. The computer platform 100 may be, for example, a mobile computing device such as a mobile phone, a tablet, a personal digital assistant, a laptop, notebook, a wearable computing device, or any other computing device capable of being moved among various locations. To facilitate dynamic group formation, the computer platform 100 includes a connection manager apparatus 105. Within the connection manager apparatus 105 is a contextual location identifier 110 that includes an optional location tracking portion 115. To track the location of the computer platform 100, the connection manager apparatus 105 may communicate with a sensor 150 that may include one or more of a global positioning system (GPS) unit, an accelerometer, a gyroscope, a wireless network sensor, a proximity sensor, or a thermal sensor. The illustrated connection manager apparatus 105 further includes an identification generator 120 to generate a contextual location identification that may be used as a token to facilitate data sharing among a group of devices. A list generator 125 may generate a list of trusted devices for the connection manager apparatus 105. A proximate device log 130 may generate a list of devices that computer platform 100 has encountered. Within the illustrated proximate device log 130 is a trust score generator 135 that may generate a trust score based on, for example, the number of encounters with a third party device such as third party devices 180. A data sharing manager 140 in the connection manager apparatus 105 may communicate with data storage 155.

The communication manager apparatus 105 may communicate with a user through a user interface 160. To communicate with other devices, an interdevice communicator 165 is provided. This may be a device using WiFi (e.g. an IEEE 802.11 protocol), a Bluetooth protocol (e.g., Bluetooth Core Specification, Version 3.0, 2009), or any other type of wireless networking device. Data sent to other devices may use the interdevice communicator 165; data may also be received through the interdevice communicator 165.

To manage the platform and to analyze data transfer, a platform manager 145 may be provided. The platform manager 145 may oversee the operations of the connection manager apparatus 105 and may include a content sharing analyzer 147, to be discussed in further detail below.

Figure 2:
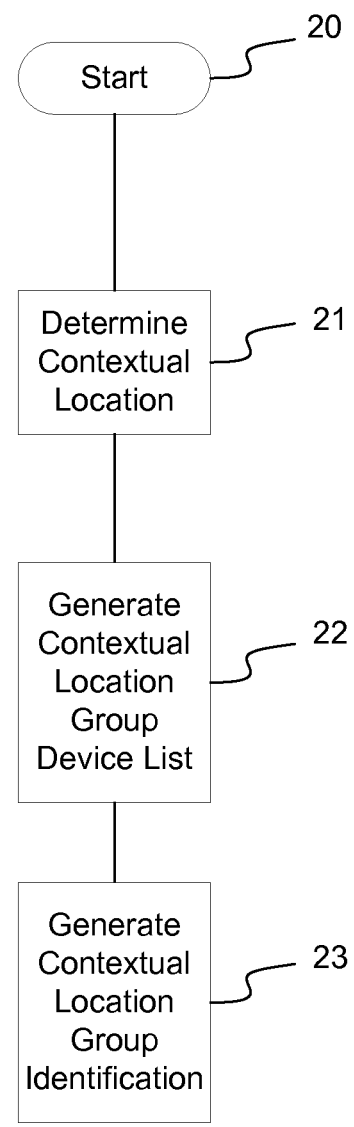
FIG. 2 is a flowchart of an example of a method of operating a connection manager apparatus according to an embodiment.

As an example, a flowchart of an overview method 10 is provided in FIG. 2 showing an optional operation procedure for a connection manager apparatus such as, for example, the connection manager apparatus 105 (FIG. 1) in dynamically creating groups of devices for sharing data. Note that a group of devices may include two or more devices. Referring to both FIGS. 1 and 2, in the start block 20, the connection manager apparatus 105 is activated. The contextual location identifier 110 determines the contextual location in illustrated block 21. For example, locations that the user visits may be monitored along with the duration of time the user spends in each location. The contextual location identifier 110 may ascertain the boundaries of these various contextual locations. An optional technique may be tracking coordinates using a GPS clustering algorithm.

In each contextual location, the connection manager apparatus 105 may come into proximity with other devices such as third party devices 180. In block 22, the proximate device log 130 may identify such proximate devices and, in connection with the list generator 125, may generate a list of trusted devices once a device is seen for a prolonged period of time or if a user has validated the third party device. This list is the contextual location group device list of block 22.

Using the center of a cluster, the connection manager apparatus 105 may use the identification generator 120 in block 23 to create a contextual location group identification that may be used as a token to facilitate data sharing with third party devices 180. That is, devices that have been added to the contextual location group device list in illustrated block 22 will receive the location group identification in block 23 that may be used as a token to transfer a file or other data among devices on the group device list in a direct peer-to-peer manner without requiring an intervening network.

Figure 3:
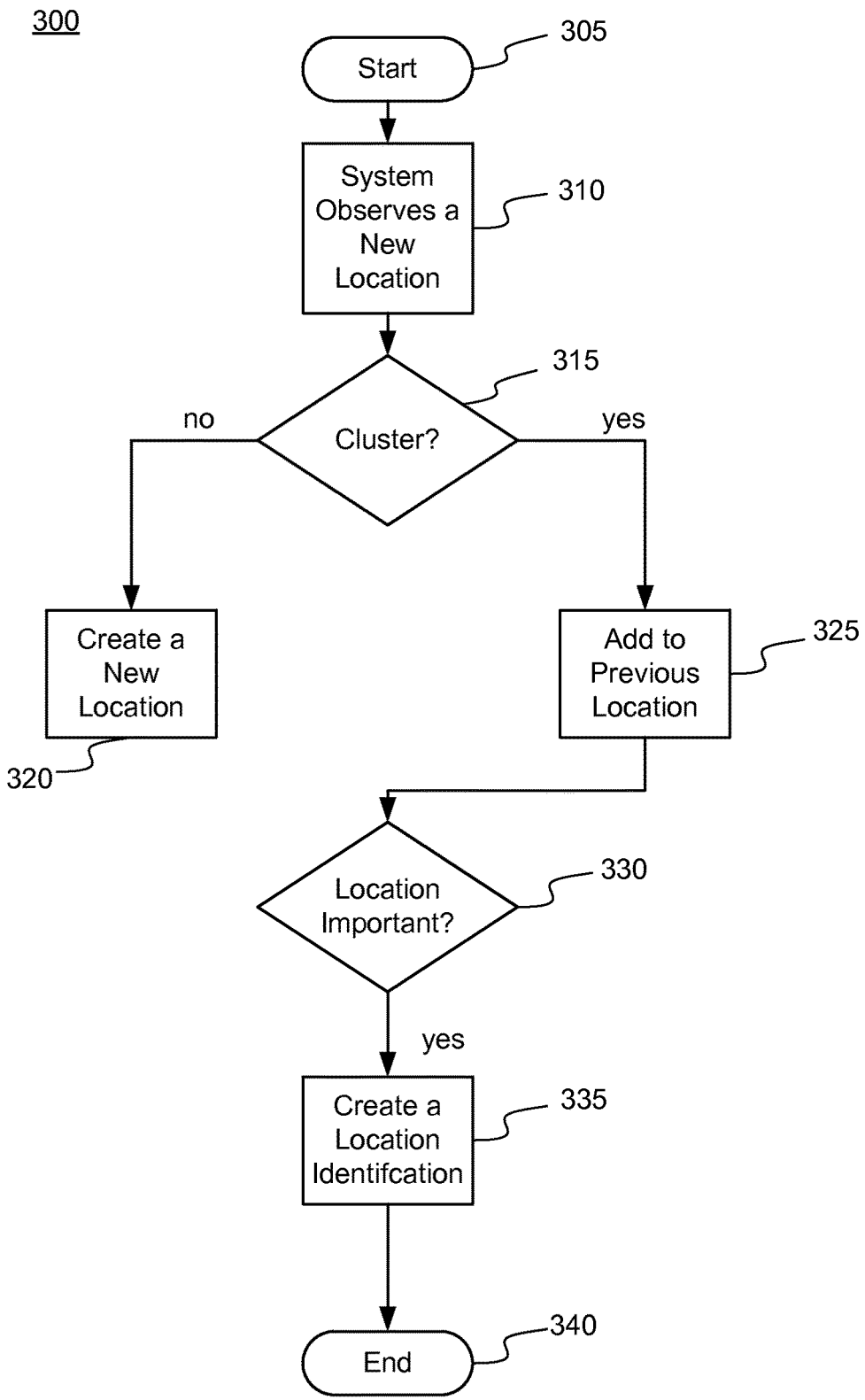
FIGS. 3 and 4 are flowcharts of examples of methods of operating a computer platform including a connection manager apparatus according to an embodiment.

A flowchart of a method 300 is provided in FIG. 3 showing an optional operation procedure for the computer platform 100 of FIG. 1 in creating a contextual location identification. The method 300, as well as the method 10 (FIG. 2), may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

Referring to both FIGS. 1 and 3, at the start in block 305 a user may designate the computer platform 100 as a primary device for creating contextual location identifications. The designated primary device is typically one that accompanies the user most frequently to the various contextual locations such as home, work, recreational locations, restaurants, hotels, etc. To assist in determining a primary device, travel time a frequency may be monitored and/or audio data indicative of human speech may be analyzed. Alternatively, the primary device may be automatically detected using knowledge of user proximity as determined by user speech recognition or body temperature via a thermal sensor or any other technology that enables a computer platform/device to recognize a user and the user proximity to the device.

The computer platform 100, assigned as the primary device, may monitor locations that the user visits and the duration of time a user spends at each location. To this end, the sensor 150 including GPS may be employed. In illustrated block 310, the computer platform 100 observes a new location. In block 315 the computer platform 100 examines the location to determine if it should be clustered with a previously-identified location. If it should not be clustered, a new contextual location may be created at block 320. If it should be clustered, the location may be added to a previously-identified contextual location in block 325. For example, a previously-identified contextual location may be "work" and the new location to be clustered is a new conference room at "work" that has not been previously visited by the user. In clustering the new conference room with the previously-identified contextual location of "work," the user is likely to encounter similar devices that require similar data sharing as the previous devices at the "work" location, making clustering a good choice for this context.

The context may be identified in a variety of ways. For example context may be identified through monitoring objects being shared and their types. From the monitored objects, keywords may be extracted to define the context. This technique may also be augmented by using reverse GPS lookups to online directories.

At illustrated block 330, the computer platform 100 analyzes the importance of the location. Importance may be determined by a number of factors including time spent at the location, frequency of travel to the location, user input, or number of devices encountered at the location. For example, for a typical user, locations that are important are the home/residence and the workplace. Others that are less important might be common places a user visits such as a coffee shop or favorite recreational area. More transient locations or locations visited by the user that are not typical contexts for data sharing (for example, a local gas station) may not be deemed as "important." If the location is deemed "important," then a location identification is generated at block 335 by contextual location identification generator 125 of connection manager apparatus 105. As discussed above, this location identification may be used as a token for data sharing among devices in a contextual location group.

Note that if a user stops going to a particular location, the context related to that location is aged and may be dropped from a list of contextual sharing groups. The user has access and control, however, over the list of contexts and locations that are being identified through user interface 160. The process of creating a contextual location identification ends at block 340.

Figure 4:
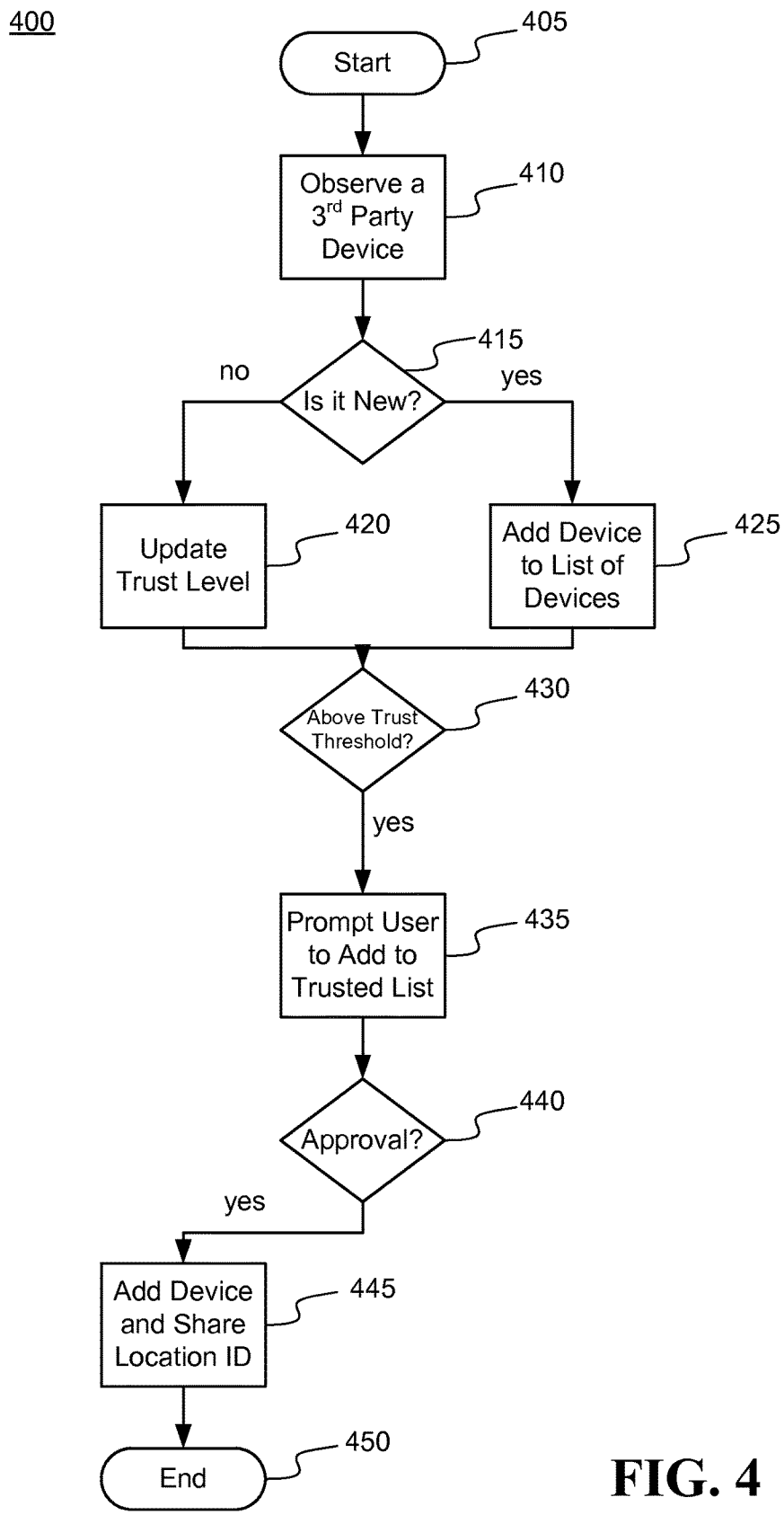

A flowchart of a method 400 is provided in FIG. 4 showing an optional operation procedure for the computer platform 100 of FIG. 1 in creating a trusted list of devices with which to share data. Referring to both FIGS. 1 and 4, the method begins in block 405 where, in each context visited by a user, the computer platform 100 comes into proximity with other devices. These devices are observed in block 410. Using the proximate device log 130 of the connection manager apparatus 105, a log of proximate devices may be kept using a unique identifier, such as a MAC address, Bluetooth address, or any other device ID that is encountered. As the computer platform 100 encounters the same device multiple times in the same context or in several contexts, the trust score generator 135 will create a trust score based on these encounters. Thus, at block 415, the proximate device log 130/trust score generator 135 will determine if the encountered device is new. If it is new, the device ID will be recorded by the proximate device log 130 at block 425. If it is a second or subsequent encounter with the device, the trust score is updated at block 420. Alternatively, a user can manually add a device to a list of trusted devices for a particular contextual location.

Once a device is seen for a prolonged period of time or for many encounters, it will achieve a threshold trust score at block 430. This score level may be determined automatically or it may be set by the user. When a device is above the trust threshold, the user may be prompted to add the device to the trusted list of devices created by the list generator 125 at block 435. Prompting may occur through any suitable user notification technique, typically through notification through the user interface 160. If the device is approved to be added to the trusted device list, it is added to the list of trusted devices by list generator 125 at block 445. The contextual location identification is then shared with this device to facilitate peer-to-peer data sharing and the process ends at block 450.

As an example of peer-to-peer data sharing, the contextual location identification may be used as a token in a Web Real Time Communication (WebRTC) file sharing process. WebRTC is an API definition drafted by the World Wide Web Consortium (W3C) that supports browser-to-browser applications for voice calling, video chat, and peer-to-peer file sharing without the need for plugins. WebRTC is supported by many browsers and HTML5 (Hyper-Text Mark-Up Language version 5). JavaScript APIs are typically employed by WebRTC. However, WebRTC lacks the contextually-aware dynamic group-forming capabilities of the above embodiments. Note that WebRTC is not the only protocol that may be used for file sharing. Other direct peer-to-peer protocols such as Intel CCF (Common Connectivity Framework) may also be used. Using WebRTC or Intel CCF, computer platform 100 may be capable of proxying connections among devices in a context or even be used as a rendezvous point allowing trusted devices to create peer-to-peer connections if they need to communicate directly without going through computer platform 100.

To further facilitate data sharing, the platform manager 145 of FIG. 1 may track the connections made by the connection manager apparatus 105. The content shared by the connection manager apparatus 105 will be analyzed by the content sharing analyzer 147. Content/data may be analyzed using metadata, file signatures, length of communication, devices that are communicating, or any other analytical tool, optionally with criteria specified by the user. Using this analysis, the platform manager 145 may determine what kind of data being shared and use this information to make recommendations of data for sharing in the future. This may facilitate sharing of certain kinds of repetitive data. For example, if a user frequently visits a park and takes photographs of his child and shares these photos with a spouse upon returning home, the platform manager 145/ content sharing analyzer 147 may highlight photos that meet sharing criteria upon the user returning home after a future visit to the park. The user may even decide to automate the sharing.

In another contextual location, the user may define that location manually as a new context and publish the contextual location identification to any device in proximity. For example, at a conference, a user may wish to share files with attendees to the user's presentation. For recurring meetings, the generated contextual location identification may be cached by the devices and re-used, making future connections faster since the discovery phase is omitted.

Figure 5:
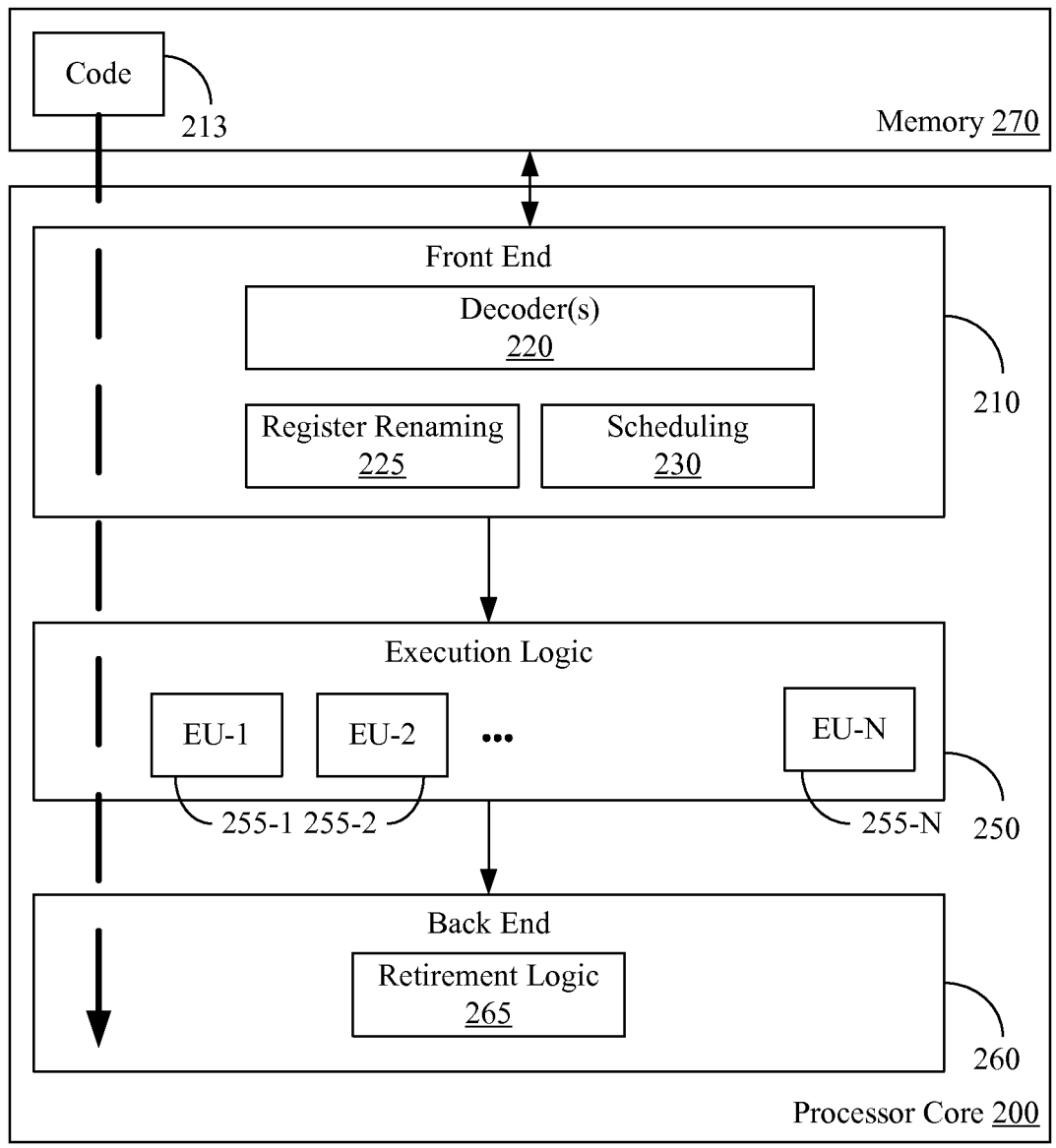
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 10 (FIG. 2), the method 300 (FIG. 3) and/or the method 400 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 6, shown is a block diagram of a system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 and 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 10 (FIG. 2), the method 300 (FIG. 3) and/or the method 400 (FIG. 4), already discussed. Further, an audio I/O 1024 may be coupled to second bus 1020.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples

Example 1 may include a computer platform to facilitate direct peer-to-peer sharing among devices including one or more sensors selected from a global positioning system, a gyroscope, an accelerometer, a wireless network sensor, or a thermal sensor, a connection manager to communicate with the one or more sensors, the connection manager including a contextual location identifier to identify a contextual location based on one or more locations frequented by a device user, a list generator to generate a contextual group device list of trusted devices within the contextual location group, and an identification generator to generate a contextual location group identification, wherein the contextual group identification is to serve as a data sharing token for the trusted devices within the contextual location group.

Example 2 may include the computer platform of example 1, further including a platform manager to communicate with the connection manager and the one or more sensors.

Example 3 may include the computer platform of examples 1 or 2, wherein the platform manager further includes a content sharing analyzer to analyze data shared with peer devices by the connection manager.

Example 4 may include the computer platform of examples 1 or 2, further including a user interface to communicate with the device manager and with the connection manager.

Example 5 may include the computer platform of examples 1 or 2, further including data storage to store data to be shared with peer devices.

Example 6 may include the computer platform of examples 1 or 2, further including an inter-device communicator.

Example 7 may include a connection manager apparatus to facilitate direct peer-to-peer data sharing among devices within a contextual location group including a contextual location identifier to determine a contextual location based on one or more locations frequented by a device user a list generator to generate a contextual location group device list of trusted devices within the contextual location group, and an identification generator to generate a contextual location group identification, wherein the contextual location group identification is to serve as a data sharing token for the trusted devices within the contextual location group.

Example 8 may include the apparatus of example 7, further including a platform manager to communicate with the connection manager.

Example 9 may include the apparatus of examples 7 or 8, wherein the platform manager further includes a content sharing analyzer to analyze data shared with peer devices by the connection manager.

Example 10 may include the apparatus of examples 7 or 8, further including a proximate device log to track proximate devices within a specified contextual location.

Example 11 may include the apparatus of examples 7 or 8, further including a trust score generator.

Example 12 may include the apparatus of examples 7 or 8, further including a data sharing manager within the connection manager to communicate with data storage.

Example 13 may include a method to facilitate direct peer-to-peer data sharing among devices within a contextual location group including determining a contextual location based on one or more locations frequented by a device user, generating a contextual location group device list of trusted devices within the contextual location group, and generating a contextual location group identification to serve as a data sharing token for the trusted devices within the contextual location group.

Example 14 may include the method of example 13, further including monitoring locations frequented by the device user using a sensor to determine the contextual location group.

Example 15 may include the method of example 14, further including monitoring the presence of other devices within the contextual location group.

Example 16 may include the method of example 15, further including determining a trust score based on the frequency of occurrence of another device within the contextual location group.

Example 17 may include the method of example 16, further including prompting the device user to add a device to the contextual location group based on the trust score.

Example 18 may include the method of examples 13 or 14, further including directly sharing data with another device in the contextual location group.

Example 19 may include the method of example 18 wherein the data sharing uses Web Real Time Communication (WebRTC).

Example 20 may include at least one computer readable storage medium comprising a set of instructions which, when executed by a computing device, cause the computing device to determine a contextual location based on one or more locations frequented by a device user generate a contextual location group device list of trusted devices within the contextual location group, and generate a contextual location group identification to serve as a data sharing token for the trusted devices within the contextual location group.

Example 21 may include the at least one computer readable storage medium of example 20, wherein the instructions, when executed, cause the computing device to monitor locations frequented by a device user to determine the contextual location group.

Example 22 may include the at least one computer readable storage medium of example 21, wherein the instructions, when executed, cause the computing device to monitor the presence of other devices within the contextual location group.

Example 23 may include the at least one computer readable storage medium of example 22, wherein the instructions, when executed, cause the computing device to determine a trust score based on the frequency of occurrence of another device within the contextual location group.

Example 24 may include the at least one computer readable storage medium of example 23, wherein the instructions, when executed, cause the computing device to prompt the device user to add a device to the contextual location group based on the trust score.

Example 25 may include the at least one computer readable storage medium of examples 20 or 21, wherein the instructions, when executed, cause the computing device to directly share data with another device in the contextual location group.

Example 26 may include the at least one computer readable storage medium of example 25 wherein data sharing uses Web Real Time Communication (WebRTC).

Example 27 may include a connection manager apparatus to facilitate direct peer-to-peer data sharing among devices within a contextual location group including means for determining a contextual location based on one or more locations frequented by a device user, means for generating a contextual location group device list of trusted devices within the contextual location group, and means for generating a contextual location group identification to serve as a data sharing token for the trusted devices within the contextual location group.

Example 28 may include the apparatus of example 27, further including means for monitoring locations frequented by the device user using a sensor to determine the contextual location group.

Example 29 may include the apparatus of example 28, further including means for monitoring the presence of other devices within the contextual location group.

Example 30 may include the apparatus of example 29, further including means for determining a trust score based on the frequency of occurrence of another device within the contextual location group.

Example 31 may include the apparatus of example 30, further including means for prompting the device user to add a device to the contextual location group based on the trust score.

Example 32 may include the apparatus of examples 27 or 28, further including means for directly sharing data with another device in the contextual location group.

Example 33 may include the apparatus of example 32 wherein the data sharing uses Web Real Time Communication (WebRTC).

Thus, embodiments described above permit contextually aware dynamic group formation that facilitates data sharing in a direct peer-to-peer manner with trusted devices. By observing locations, creating contextual location identifications, and creating trusted device lists, groups are formed in an intuitive manner with minimal user intervention, creating a more seamless data-sharing experience that mimics natural patterns of human contact.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computer platform comprising:
   one or more sensors selected from a global positioning system, a gyroscope, an accelerometer, a wireless network sensor, a proximity sensor, or a thermal sensor;
   a connection manager to communicate with the one or more sensors, the connection manager including:
      a contextual location identifier to identify a contextual location based on one or more locations frequented by a device user;
      a list generator to generate a list of trusted devices within a contextual location group; and
      an identification generator to generate a contextual location group identification, wherein the contextual group identification is to serve as a data sharing token for the trusted devices within the contextual location group, wherein the data sharing token is to permit transferring files or other data among the trusted devices on the group device list in a direct peer-to-peer manner without involving an intervening network, and wherein when the computer platform is designated as a primary device the identification generator is configured to generate the contextual location group identification based on a frequency that the computer platform is to be encountered at a plurality of contextual locations.

2. The computer platform of claim 1, further comprising a platform manager to communicate with the connection manager and the one or more sensors.

3. The computer platform of claim 2, wherein the platform manager further includes a content sharing analyzer to analyze data shared with peer devices by the connection manager.

4. The computer platform of claim 1, further comprising a user interface to communicate with the device manager and with the connection manager.

5. The computer platform of claim 1, further comprising data storage to store data to be shared with peer devices.

6. The computer platform of claim 1, further comprising an inter-device communicator.

7. A connection manager apparatus comprising:
   a contextual location identifier to determine a contextual location based on one or more locations frequented by a device user;
   a list generator to generate a list of trusted devices within a contextual location group; and
   an identification generator to generate a contextual location group identification, wherein the contextual location group identification is to serve as a data sharing token for the trusted devices within the contextual location group, wherein the data sharing token is to permit transferring files or other data among the trusted devices on the group device list in a direct peer-to-peer manner without involving an intervening network, and wherein when the connection manager apparatus is designated as a primary device the identification generator is configured to generate the contextual location group identification based on a frequency that the connection manager apparatus is to be encountered at a plurality of contextual locations.

8. The apparatus of claim 7, further comprising a proximate device log to track proximate devices within a specified contextual location.

9. The apparatus of claim 7, further comprising a trust score generator.

10. The apparatus of claim 7, further comprising a data sharing manager within the connection manager to communicate with data storage.

11. A method to facilitate direct peer-to-peer data sharing among devices within a contextual location group comprising:
   determining a contextual location based on one or more locations frequented by a device user;
   generating a list of trusted devices within a contextual location group; and
   generating a contextual location group identification to serve as a data sharing token for the trusted devices within the contextual location group, wherein the data sharing token permits transferring files or other data among the trusted devices on the group device list in a direct peer-to-peer manner without involving an intervening network, and wherein when a device of the trusted devices within the contextual location group is designated as a primary device the device is configured to generate the contextual location group identification based on a frequency that the device is encountered at a plurality of contextual locations.

12. The method of claim 11, further comprising monitoring locations frequented by the device user using a sensor to determine the contextual location group.

13. The method of claim 12, further comprising monitoring the presence of other devices within the contextual location group.

14. The method of claim 13, further comprising determining a trust score based on the frequency of occurrence of another device within the contextual location group.

15. The method of claim 14, further comprising prompting the device user to add a device to the contextual location group based on the trust score.

16. The method of claim 13, further comprising directly sharing data with another device in the contextual location group.

17. The method of claim 16 wherein the data sharing uses Web Real Time Communication (WebRTC).

18. At least one non-transitory computer readable storage medium comprising a set of instructions which, when executed by a computing device, cause the computing device to:
   determine a contextual location based on one or more locations frequented by a device user;
   generate a list of trusted devices within a contextual location group; and generate a contextual location group identification to serve as a data sharing token for the trusted devices within the contextual location group, wherein the data sharing token is to permit transferring files or other data among the trusted devices on the group device list in a direct peer-to-peer manner without involving an intervening network, and wherein when a device of the trusted devices within the contextual location group is designated as a primary device the device is configured to generate the contextual location group identification based on a frequency that the device is to be encountered at a plurality of contextual locations.

19. The at least one non-transitory computer readable storage medium of claim 18, wherein the instructions, when executed, cause the computing device to monitor locations frequented by a device user to determine the contextual location group.

20. The at least one non-transitory computer readable storage medium of claim 19, wherein the instructions, when executed, cause the computing device to monitor the presence of other devices within the contextual location group.

21. The at least one non-transitory computer readable storage medium of claim 20, wherein the instructions, when executed, cause the computing device to determine a trust score based on the frequency of occurrence of another device within the contextual location group.

22. The at least one non-transitory computer readable storage medium of claim 21, wherein the instructions, when executed, cause the computing device to prompt the device user to add a device to the contextual location group based on the trust score.

23. The at least one non-transitory computer readable storage medium of claim 18, wherein the instructions, when executed, cause the computing device to directly share data with another device in the contextual location group.

24. The at least one non-transitory computer readable storage medium of claim 23 wherein data sharing uses Web Real Time Communication (WebRTC).

* * * * *